(12) United States Patent
Hu et al.

(10) Patent No.: US 10,507,710 B2
(45) Date of Patent: Dec. 17, 2019

(54) SUN VISOR

(71) Applicant: BOE TECHNOLOGY GROUP CO., LTD., Beijing (CN)

(72) Inventors: Nannan Hu, Beijing (CN); Lei Cao, Beijing (CN); Zifeng Wang, Beijing (CN); Yan Ren, Beijing (CN); She Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/759,080

(22) PCT Filed: Sep. 15, 2017

(86) PCT No.: PCT/CN2017/101956
§ 371 (c)(1),
(2) Date: Mar. 9, 2018

(87) PCT Pub. No.: WO2018/149126
PCT Pub. Date: Aug. 23, 2018

(65) Prior Publication Data
US 2019/0047383 A1   Feb. 14, 2019

(30) Foreign Application Priority Data

Feb. 14, 2017 (CN) .......................... 2017 1 0079128

(51) Int. Cl.
*B60J 3/02* (2006.01)
*G02F 1/133* (2006.01)
*B60J 3/04* (2006.01)

(52) U.S. Cl.
CPC ........... *B60J 3/0208* (2013.01); *B60J 3/0204* (2013.01); *B60J 3/04* (2013.01); *G02F 1/13318* (2013.01)

(58) Field of Classification Search
CPC ............... B60J 3/0204; G09G 3/3406; G09G 2360/144
See application file for complete search history.

(56) References Cited

U.S. PATENT DOCUMENTS 5,947,544 A * 9/1999 Hubeshi ................. B60J 1/2019
160/23.1
7,413,233 B1 * 8/2008 Jung .................... B60R 11/0235
296/97.7

FOREIGN PATENT DOCUMENTS

CN     204526751 U     8/2015
CN     205468450 U     8/2016
(Continued)

OTHER PUBLICATIONS

International Search Report and Written Opinion for International Appl. No. PCT/CN2017/101956, dated Nov. 30, 2017.

*Primary Examiner* — Kent W Chang
*Assistant Examiner* — Chayce R Bibbee
(74) *Attorney, Agent, or Firm* — Foley & Lardner LLP; James F. Ewing; Paul M. H. Pua

(57) ABSTRACT

The present disclosure discloses a sun visor comprising: a supporting portion (1); a liquid crystal panel (5) fixed onto the supporting portion, or provided integrally with the supporting portion; a first light barrier (4) at least including two kinds of state: expanded and storage, wherein the first light barrier is parallel with the liquid crystal panel when in the expanded state, and an orthographic projection of the liquid crystal panel on the first light barrier falls into the first light barrier; a photosensitive sensor (8) for detecting an intensity of an interference light; and a control circuit connected with the photosensitive sensor and the liquid crystal panel, for adjusting a driving voltage with respect to the liquid crystal panel according to a detection result of the photosensitive sensor.

14 Claims, 6 Drawing Sheets

(56) References Cited

FOREIGN PATENT DOCUMENTS

| CN | 205523584 U | 8/2016 |
|---|---|---|
| CN | 106739995 A | 5/2017 |
| CN | 206456219 U | 9/2017 |
| DE | 102005013173 A1 | 9/2006 |
| JP | 5632878 B2 | 11/2014 |

* cited by examiner

SUN VISOR

CROSS-REFERENCE TO RELATED APPLICATIONS

The present application is a U.S. National Stage under 35 U.S.C. § 371 of PCT/CN2017/101956, filed on Sep. 15, 2017, which claims priority to and the benefit of Chinese Patent Application No. 201710079128.5, filed on Feb. 14, 2017, the disclosure of which is incorporated herein in its entirety by reference

TECHNICAL FIELD

The present disclosure relates to a sun visor.

BACKGROUND

When a driver drives his motor vehicle at a high speed, he may be affected by severe glare, flare, and etc., e.g., strong sunlight, high beams at night from the vehicle in the opposite direction, reflected light of snow in winter, sudden change of light in tunnels, and eyestrain and instantaneous blindness caused thereby are important reasons for traffic accidents. Protecting the driver's eyes from not being stimulated by the glare outside is very important for improving driving safety.

At present, in order to prevent eyestrain of the driver caused by glare stimulation, a sun visor is often provided on the front window of the vehicle. For the traditional sun visor, when in use, the visor body is rotated down to block upper portion of the light rays to the driver's eyes, which makes sure that the driver can clearly see the outside of the vehicle. When light shading is not needed, the sun visor is turn down.

SUMMARY

Some embodiments of the present disclosure provide a sun visor comprising: a supporting portion; a liquid crystal panel fixed onto the supporting portion, or provided integrally with the supporting portion; a first light barrier at least including an expanded state and a storage state, wherein the first light barrier is parallel or approximately parallel with the liquid crystal panel when in the expanded state, and an orthographic projection of the liquid crystal panel on the first light barrier falls into the first light barrier; a photosensitive sensor configured for detecting an intensity of an interference light; and a control circuit connected with the photosensitive sensor and the liquid crystal panel and configured for adjusting a driving voltage of the liquid crystal panel according to a detection result of the photosensitive sensor.

Alternatively, the sun visor further comprises: a light source fixed onto the supporting portion, wherein the light source is interposed between the first light barrier and the liquid crystal panel; a side of the first light barrier close to the liquid crystal panel comprises a reflective layer.

Alternatively, the sun visor further comprises: a first shaft fixed to a first side of the supporting portion, located at a side of the liquid crystal panel facing away from the user and being parallel with the liquid crystal panel; a side of the first light barrier is fixed onto the first shaft, and is capable of being stretched in a direction parallel with the liquid crystal Panel and contracted onto the first shaft in a windable manner.

Alternatively, the first light barrier further comprises a first fixing member arranged on a side opposite to the side of the first light barrier fixed onto the first shaft, for fixing the side opposite to the side of the first light barrier fixed onto the first shaft, onto a second side of the supporting portion, when the first light barrier is in the expanded state.

Alternatively, the sun visor further comprises: a second light barrier which is parallel with the liquid crystal panel when in the expanded state.

Alternatively, the sun visor further comprises: a second shaft fixed to the first side of the supporting portion, being parallel with the first shaft, and located on a side of the liquid crystal panel close to the user; a second light barrier which is parallel with the liquid crystal panel when in an expanded state, wherein a side of the second light barrier is fixed onto the second shaft, and is capable of being stretched in a direction parallel with the liquid crystal panel and contracted onto the second shaft in a windable manner; orthographic projections of the first shaft and the second shaft on the liquid crystal panel in the radial direction do not overlapped with each other.

Alternatively, another side of the supporting portion is provided with a first groove, such that the first fixing member sticks into the first groove when the first light barrier is in the expanded state.

Alternatively, the sun visor further comprises: a second shaft fixed to the first side of the supporting portion, located on a side of the liquid crystal panel close to the user, and being parallel with the liquid crystal panel; wherein a side of the second light barrier is fixed onto the second shaft, and is capable of being stretched in a direction parallel with the liquid crystal panel and contracted onto the second shaft in a windable manner.

Alternatively, the second light barrier further comprises a second fixing member arranged on a side opposite to the side of the second light barrier fixed onto the second shaft, for fixing the side opposite to the side of the second light barrier fixed onto the second shaft, onto a second side of the supporting portion, when the second light barrier is in the expanded state.

Alternatively, another side of the supporting portion is provided with a second groove, such that the second fixing member sticks into the second groove when the second light barrier is in the expanded state.

Alternatively, the first light barrier is flexible.

Alternatively, the first light barrier and the second light barrier are flexible.

According to some embodiments of this disclosure, the sun visor comprises: a supporting portion, a first light barrier, a liquid crystal panel, a photosensitive sensor and a control circuit. The liquid crystal panel is fixed onto the supporting portion or is provided integrally with the supporting portion, and the first light barrier at least includes two kinds of state: expanded and storage. The first light barrier is parallel with the liquid crystal panel when in the expanded state, and the orthographic projection of the liquid crystal panel on the first light barrier completely falls into the first light barrier, thereby achieving the light shading function of the traditional sun visor. When the first light barrier is in the stored state, the photosensitive sensor is used for detecting the intensity of the interference light, and the control circuit is connected with the photosensitive sensor and the liquid crystal panel, and is used for adjusting the driving voltage with respect to the liquid crystal panel according to the detection result of the photosensitive sensor, thereby adjusting the light transmittance of the liquid crystal panel to realize intelligent light control. In addition, the sun visor can also realize transmissive display.

BRIEF DESCRIPTION OF THE DRAWINGS

To describe the technical solutions in the embodiments of the present disclosure more clearly, the accompanying drawings used in the description of the embodiments are briefly introduced in the following. Evidently, the accompanying drawings are only some embodiments of the present disclosure, and persons of ordinary skill in the art may also obtain other drawings according to these accompanying drawings.

The accompanying drawings herein are incorporated into the specification and form part of the specification, showing the embodiments that conform to this disclosure and are used together with the description to explain the principles of this disclosure.

DETAILED DESCRIPTION

In order to make the objectives, technical solutions, and advantages of the present disclosure clearer and more comprehensible, the present disclosure is further described in detail in the following with reference to the accompanying drawings. Evidently, the embodiments in the following description are only a part rather than all of the embodiments of the present disclosure. Based on the embodiments in the present disclosure, all other embodiments obtained by persons of ordinary skill in the art without creative efforts shall fall within the protection scope of the present disclosure.

Figure 1:
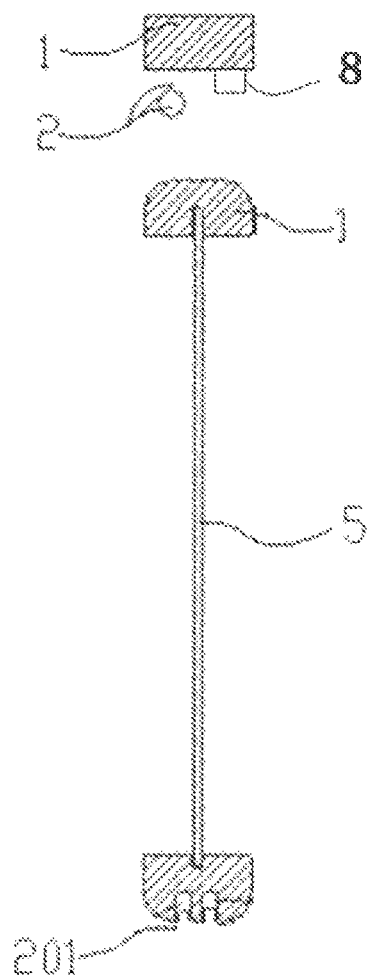
FIG. 1 is a sectional view of an operating state of a sun visor provided according to some embodiments of the present disclosure.
Figure 2:
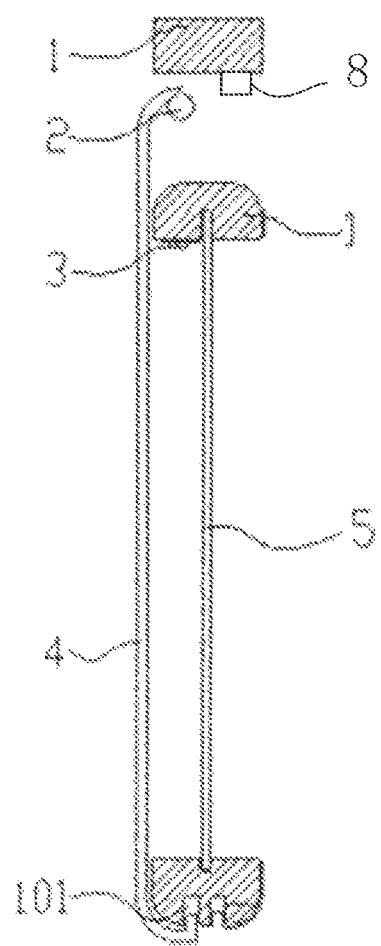
FIG. 2 is a sectional view of another operating state of a sun visor provided according to some embodiments of the present disclosure.

As shown in FIG. 1 and FIG. 2, the sun visor provided according to the embodiments of the present disclosure comprises: a supporting portion 1, a first light barrier 4, a liquid crystal panel 5, a photosensitive sensor 8 and a control circuit (not shown in the figures).

The liquid crystal panel 5 can be fixed onto the supporting portion 1, which, at this time, can be the sun visor body, and the liquid crystal panel 5 may be provided integrally with the supporting portion 1. The first light barrier 4 may have two kinds of state: expanded and storage. As shown in FIG. 1, in some embodiments of this disclosure, when the first light barrier 4 is in the expanded state, it is parallel with the liquid crystal panel 5, and the liquid crystal panel 5 is located on a side of the first light barrier 4 close to the user, the orthographic projection of the liquid crystal panel 5 on the first light barrier completely falls into the first light barrier, and the sun visor can shade light like a traditional sun visor. At this time the power supply connected to the liquid crystal panel can be turned off to save power. The first light barrier 4 can also be approximately parallel with the liquid crystal panel 5, where the term "approximate parallel" refers to that an angle between the first light barrier 4 and the liquid crystal panel 5 is between 10 and 15 degrees. At this time the volume of the sun visor can be minimized, while the light emission and display are made more evenly as the display function is realized.

Figure 6:
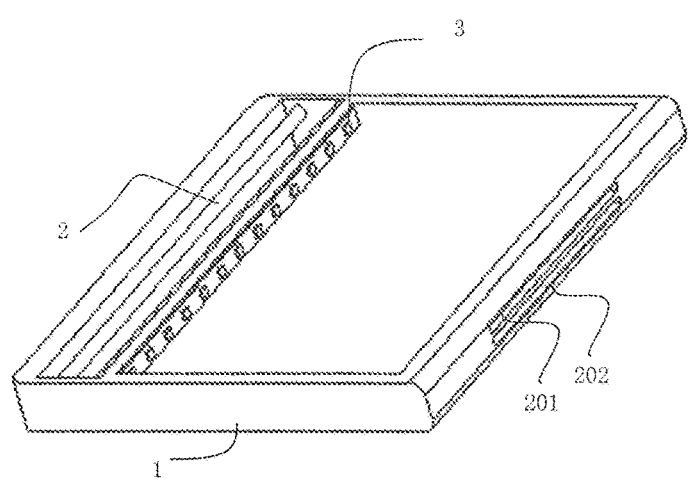
FIG. 6 is a structural diagram of a sun visor provided according to some embodiments of the present disclosure.

In some embodiments of this disclosure, the sun visor further comprises a first shaft 2. The first shaft 2 is adjacent to a side surface of the supporting portion 1 and is fixed onto the supporting portion 1. As shown in FIG. 1 and FIG. 6, the first shaft 2 is close to a surface at the top of the sun visor, and alternatively the first shaft 2 may be also close to a surface on the bottom of the sun visor or other surfaces, which is not limited thereto. In some embodiments of this disclosure, the first shaft 2 is arranged in parallel with the side surface, and a side of the first light barrier 4 is fixed onto the first shaft 2 and is stretchable in the direction perpendicular to the first shaft 2. As shown in FIG. 2, the upper side of the first light barrier 4 is fixed onto the first shaft 2, and alternatively it may be that another side of the first light barrier 4 is fixed to the first shaft 2, which is not limited thereto. When the first light barrier 4 is in the storage state, as shown in FIG. 1, the first light barrier 4 can be contracted onto the first shaft 2 in a winding manner.

The photosensitive sensor 8 can be arranged on the supporting portion 1, or on the liquid crystal panel 5 or other positions of the sun visor, for detecting the intensity of the interference light. The interference light described herein is glare, flare and etc. that irradiate from a side of the first light barrier 4 facing away from the liquid crystal panel 5 to the vehicle to interfere with the driver, such as strong sunlight, high beams at night from the vehicles in the opposite direction, reflected light of snow in winter, sudden change of light in the tunnels. Any outside glare that may cause eyestrain and instantaneous blindness belongs to an interference light. The control circuit is connected with the photosensitive sensor 8, for receiving the detection result of the intensity of the interference light, sent by the photosensitive sensor 8, and adjusting the driving voltage with respect to the liquid crystal panel 5 according to the detection result. Here the term "connection" can be a direct connection, can also include coupling which can be wireless or wired connection, as long as the signal transmission can be achieved. The control circuit may be arranged on the supporting portion 1, or may be arranged on the liquid crystal panel 5 or other positions of the sun visor.

Figure 7:
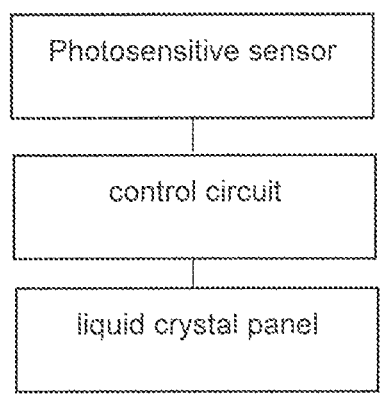
FIG. 7 is a schematic diagram showing a connection relation of some components of a sun visor provided according to some embodiments of the present disclosure.

The liquid crystal panel 5 comprises two display substrates and a liquid crystal layer sandwiched between the two display substrates. At least one of the substrates is provided with a driving array, every unit of each driving array constitutes a pixel, and each pixel includes a TFT (Thin Film transistor), a pixel electrode, a common electrode, etc. In some embodiments of this disclosure, a polarizer is provided respectively on a side surface of the two display substrates that faces away from the liquid crystal layer. The liquid crystal panel includes a data signal driver and other components, the TFT is connected with the data signal driver, and the data signal driver is connected with the control circuit. As shown in FIG. 1 and FIG. 7, when the first light barrier 4 is in the storage state, the photosensitive sensor 8 detects the intensity of the interference light and converts the light signal into an electrical signal. The control circuit adjusts the driving voltage of the data signal driver according to the received detection result of the photosensitive sensor 8, and further adjusts deflection angles of the liquid crystals in the liquid crystal Panel 5 through the driving voltage. When the deflection angles of the liquid crystals change, the polarization angle of the light through the liquid crystal panel 5 will change with it, and in combination with the function of the polarizer, the intensity of the light changes to thereby achieve intelligent light control.

As shown in FIG. 1, when the first light barrier 4 is contracted onto the first shaft 2 in a contracted state, the photosensitive sensor 8 can detect the intensity of the interference light and convert the light signal of the interference light into an electrical signal. When the interference light is too strong to affect the driver's vision, for example when the intensity of the interference light is larger than a certain threshold value, the photosensitive sensor 8 detects the glare signal, converts it into a corresponding electrical signal and passes it to the control circuit. Since the control circuit is connected with the data signal driver, the data signal driver outputs the corresponding driving voltage to the TFT of the liquid crystal panel 5. By controlling the liquid crystal deflection angle of the liquid crystal panel 5 by the TFT, the light transmittance is lowered. In case where the Photosensitive sensor 8 detects that the interference light is not strong, for example when the intensity of the interference light is less than a certain threshold value, the photosensitive sensor 8 detects the glare signal, converts it into the corresponding electrical signal and passes it to the control circuit. Since the control circuit is connected with the data signal driver, the data signal driver outputs the corresponding driving voltage to the TFT of the liquid crystal panel 5. By controlling the liquid crystal deflection angle of the liquid crystal panel 5 by the TFT, the light transmittance is increased. Therefore, the sun visor can realize the intelligent light control function.

In addition, when the ambient light is sufficient, the liquid crystal panel 5 can also use the ambient light for transmissive display, thereby realizing the display function. The liquid crystal panel 5 for example can display navigation information, or display rear view images or play video. When the liquid crystal panel is used for display, other components such as power supply, driving circuit can be shared with the vehicle containing the sun visor.

Alternatively, the sun visor may further comprise a light source 3. In some embodiments of this disclosure, the light source 3 is fixed onto the supporting portion, and is located between the first light barrier 4 and the liquid crystal panel 5. The side of the first light barrier 4 close to the liquid crystal panel 5 includes a reflective layer. The reflective layer can be a reflective layer separately arranged outside the first light barrier 4, or the outside of the first light barrier 4 can be made of a reflective material.

When the first light barrier 4 is in the expanded state, the first light barrier 4 is located on a side of the liquid crystal panel 5 away from the user, and the orthographic projection of the liquid crystal panel 5 on the first light barrier 4 can completely fall into the first light barrier 4. At this time the light source 3 can serve as a backlight source of the liquid crystal panel 5, and the liquid crystal panel 5 can serve as an active liquid crystal display screen for image display, thereby realizing the display function. The liquid crystal panel 5 for example can display navigation information, and can also display rear view images or play video. When the liquid crystal panel 5 is used for display, it shares components such as power supply with the vehicle that contains the sun visor.

Alternatively, a side of the supporting portion 1 opposite to the side thereof adjacent to the first shaft 2 may further comprise a first groove 201, and a side of the first light barrier 4 opposite to the side thereof fixed to the first shaft 2 may further comprise a first fixing member 101. For example, as shown in FIG. 2 and FIG. 6, the bottom of the supporting portion 1 is provided with the first groove 201, and the lower side of the first light barrier 4 is provided with the first fixing member 101. When the first light barrier 4 is in the expanded state, the first fixing member 101 can be stuck into the first groove 201, for fixing a side of the first light barrier 4 opposite to the side fixed to the first shaft 2. The first fixing member 101 can be but is not limited to a L shape.

Alternatively, the supporting portion 1 can also be transparent, which will not interfere with the driver's local vision, so PC (polycarbonate, transparent polycarbonate) or PMMA (polymethyl methacrylate) material can be used. The supporting portion 1 is not limited to the above materials.

Alternatively, the first light barrier 4 is flexible, capable of being stored, expanded and so on.

To sum up, the sun visor provided according to the embodiments of the present disclosure comprises: a supporting portion 1, a first light barrier 4, a liquid crystal panel 5, a photosensitive sensor 8 and a control circuit. When the first light barrier 4 is in the storage state, the photosensitive sensor 8 can detect the intensity of the interference light, and by adjusting the driving voltage of the liquid crystal panel 5 by the control circuit, thereby adjusting the light transmittance of the liquid crystal panel 5. Therefore, the intelligent light control function can be realized. When the first light barrier 4 is in the expanded state, it can serve as a traditional sun visor, and when the ambient light is comparatively sufficient, the liquid crystal panel 5 can perform transmissive display. The sun visor may further comprise a light source 3. The liquid crystal panel 5 utilizes the light source 3 as a backlight for display, thereby realizing the display function. Therefore, it solves the problem that the sun visor in the prior art only has a single function, satisfies different users' usage habits, enhances the user experience, and achieves the effect of enriching the function of the sun visor.

Figure 3:
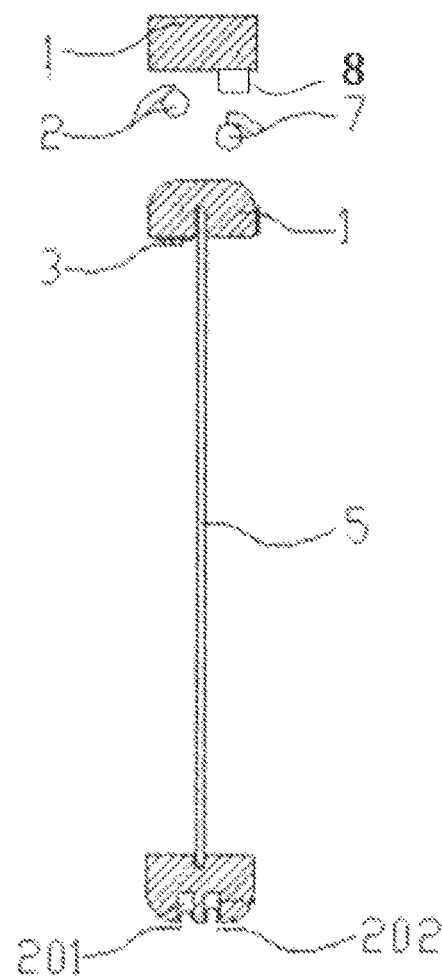
FIG. 3 is a sectional view of an operating state of a sun visor provided according to some other embodiments of the present disclosure.
Figure 4:
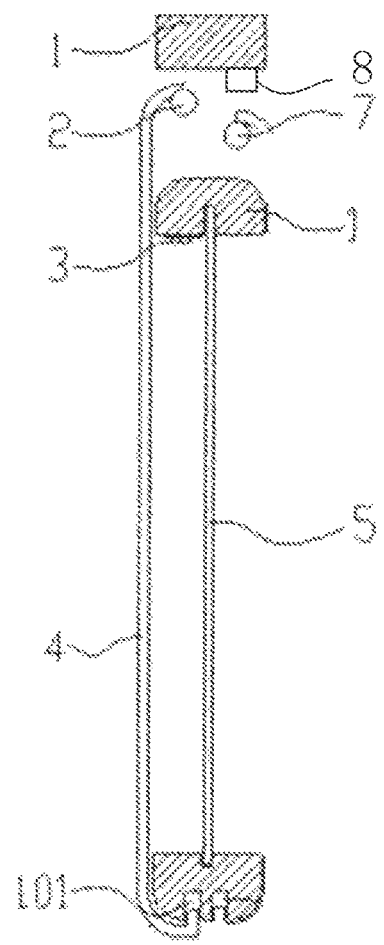
FIG. 4 is a sectional view of another operating state of a sun visor provided according to some other embodiments of the present disclosure.
Figure 5:
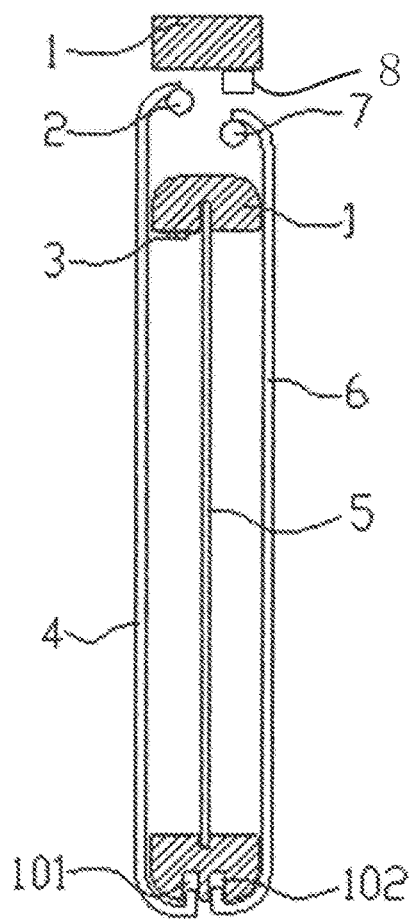
FIG. 5 is a sectional view of a further operating state of a sun visor provided according to some other embodiments of the present disclosure.

As shown in FIG. 3, FIG. 4 and FIG. 5, the sun visor provided according to another embodiment of this disclosure comprises: a supporting portion 1, a first light barrier 4, a second light barrier 6, a liquid crystal panel 5, a photosensitive sensor 8 and a control circuit (not shown in the figures).

The liquid crystal panel 5 may be fixed onto the supporting portion 1, which, at this time, can be the sun visor body, and the liquid crystal panel 5 can also be provided integrally with the supporting portion 1. The first light barrier 4 and the second light barrier 6 both can have two kinds of state: expanded and storage. When the first light barrier 4 and the second flap 6 are in the expanded state, the orthographic projections of the liquid crystal panel 5 on the first light barrier 4 and the second light barrier 6 completely fall into the first light barrier 4 and the second light barrier 6. At this time the sun visor can shade light like a traditional sun visor, and at this time the power supply connected with the liquid crystal panel 5 can be turned off to save electrical energy.

In some embodiments of this disclosure, the sun visor further comprises a first shaft 2 and a second shaft 7, wherein the first shaft 2 is adjacent to a side surface of the supporting portion 1 and is fixed onto the supporting portion 1. As shown in FIG. 3 and FIG. 6, the first shaft 2 is close to a surface at the top of the sun visor, and alternatively the first shaft 2 can also be close to a surface on the bottom of the sun visor or other surfaces, which is not limited thereto. In some embodiments of this disclosure, the first shaft 2 is arranged in parallel with the side surface, a side of the first light barrier 4 is fixed onto the first shaft 2 and can be stretched in the direction perpendicular to the first shaft 2. As shown in FIG. 4, the upper side of the first light barrier 4 is fixed onto the first shaft 2, and of course it may be that another side of the first light barrier 4 is fixed to the first shaft 2, which is not limited thereto. When the first light barrier 4 is in the storage state, as shown in FIG. 3, the first light barrier 4 may be contracted onto the first shaft 2 in a winding manner. The second shaft 7 is fixed onto the supporting portion 1, and is adjacent to a side surface of the supporting portion 1. The side surface is a surface of the sun visor adjacent to the first shaft, e.g., as shown in FIG. 3, the surface at the top of the sun visor. Moreover, the second shaft 7 is arranged in parallel with the first shaft 2, and a side of the second light barrier is fixed onto the second shaft 7. As shown in FIG. 5, the upper side of the second light barrier 6 is fixed onto the second shaft 7 or other sides, which is not limited thereto. When the second light barrier 6 is in the storage state, as shown in FIG. 3, it can be contracted onto the second shaft 7 in a winding manner.

The photosensitive sensor 8 may be arranged on the supporting portion 1, or may be arranged on the liquid crystal panel or other positions of the sun visor for detecting the intensity of the interference light. The interference light described herein is glare, flare and etc. that irradiates from a side of the first light barrier 4 facing away from the liquid crystal panel 5 to the vehicle to interfere with the driver, such as strong sunlight, high beams at night from the vehicles in the opposite direction, reflected light of snow in winter, sudden change of light in the tunnels. Any outside glare that may cause eyestrain and instantaneous blindness belongs to an interference light. The control circuit is connected with the photosensitive sensor 8, for receiving the detection result of the intensity of the interference light, sent by the photosensitive sensor 8, and adjusting the driving voltage with respect to the liquid crystal panel 5 according to the detection result. Here the term "connection" can be a direct connection, can also include coupling which can be wireless or wired connection, as long as the signal transmission can be achieved. The control circuit may be arranged on the supporting portion 1, or may be arranged on the liquid crystal panel 5 or other positions of the sun visor.

When the first light barrier 4 and the second light barrier 6 are in the expanded states, the liquid crystal panel 5 is parallel with the first light barrier 4 and the second light barrier 6, and is in the middle of the two light barriers.

The liquid crystal panel 5 comprises two display substrates and a liquid crystal layer sandwiched between the two display substrates. At least one of the substrates is provided with a driving array, every unit of each driving array constitutes a pixel, and each pixel includes a TFT, a pixel electrode, a common electrode, etc. In some embodiments of this disclosure, a polarizer is provided respectively on a side surface of the two display substrates that faces away from the liquid crystal layer. The liquid crystal panel includes a data signal driver and other components, the TFT is connected with the data signal driver, and the data signal driver is connected with the control circuit. As shown in FIG. 3 and FIG. 7, the photosensitive sensor 8 detects the intensity of the interference light and converts the light signal into an electrical signal. The control circuit adjusts the driving voltage of the data signal driver according to the received detection result of the photosensitive sensor 8, and further adjusts deflection angles of the liquid crystals in the liquid crystal panel 5 through the driving voltage. When the deflection angles of the liquid crystals change, the polarization angle of the light through the liquid crystal panel 5 will change with it, and in combination with the function of the polarizer, the intensity of the light changes to thereby achieve intelligent light control.

As shown in FIG. 3, when the first light barrier 4 and the second light barrier 5 both are in the contracted states, the photosensitive sensor 8 can detect the intensity of the interference light and convert the light signal of the interference light into an electrical signal. When the interference light is too strong to affect the driver's vision, for example when the intensity of the interference light is larger than a certain threshold value, the photosensitive sensor 8 detects the glare signal, converts it into a corresponding electrical signal and passes it to the control circuit. Since the control circuit is connected with the data signal driver, the data signal driver outputs the corresponding driving voltage to the TFT of the liquid crystal panel 5. By controlling the liquid crystal deflection angle of the liquid crystal panel 5 by the TFT, the light transmittance is lowered. In case where the photosensitive sensor 8 detects that the interference light is not strong, for example when the intensity of the interference light is less than a certain threshold value, the photosensitive sensor 8 detects the glare signal, converts it into the corresponding electrical signal and passes it to the control circuit. Since the control circuit is connected with the data signal driver, the data signal driver outputs the corresponding driving voltage to the TFT of the liquid crystal panel 5. By controlling the liquid crystal deflection angle of the liquid crystal panel 5 by the TFT, the light transmittance is increased. Therefore, the sun visor can realize the intelligent light control function.

As shown in FIG. 4, when the first light barrier 4 is in the expanded state, the first light barrier 4 is located on a side of the liquid crystal panel 5 away from the user, and the orthographic projection of the liquid crystal panel 5 on the first light barrier 4 can completely fall into the first light barrier. The second light barrier 6 is in a contracted state and can also shade light like a traditional sun visor. When the second light barrier 6 is also in the expanded state, as shown in FIG. 5, the light shading effect at this time is more evident, and is more consistent with the user's traditional usage habits. When the sun visor is used as a traditional sun visor, the liquid crystal panel does not work at all, for the purpose of power saving. When the ambient light is sufficient enough, the liquid crystal panel 5 can utilize the ambient light for transmissive display of the images, thereby realizing the display function. The liquid crystal panel 5 for example can display navigation information, or display rear view images or play video. When the liquid crystal panel is used for display, it shares other components such as power supply with the vehicle containing the sun visor.

In some embodiments of this disclosure, the sun visor may further comprise a light source 3. In some embodiments of this disclosure, the light source 3 is fixed onto the supporting portion, and is located between the first light barrier 4 and the liquid crystal panel 5. The side of the first light barrier 4 close to the liquid crystal panel 5 includes a reflective layer. The reflective layer can be a reflective layer separately arranged outside the first light barrier 4, or the outside of the first light barrier 4 can be made of a reflective material. When the first light barrier 4 is in the expanded state and the second light barrier 6 is in the storage state, the first light barrier 4 is located on a side of the liquid crystal panel 5 away from the user, and the orthographic projection of the liquid crystal panel 5 on the first light barrier 4 can completely fall into the first light barrier 4. At this time the light source 3 can serve as a backlight source of the liquid crystal panel 5, and the liquid crystal panel 5 can serve as an active liquid crystal display screen for image display, thereby realizing the display function. The liquid crystal panel 5 for example can display navigation information, and can also display rear view images or play video. When the liquid crystal panel 5 is used for display, it shares components such as power supply, driving circuit with the vehicle that contains the sun visor.

In some embodiments of this disclosure, as shown in FIG. 5 and FIG. 6, a side of the supporting portion 1 opposite to the side thereof adjacent to the first shaft and the second shaft may further comprise a first groove 201, and a side of the first light barrier 4 opposite to the side thereof fixed to the first shaft 2 may further comprise a first fixing member 101. As shown in FIG. 4 and FIG. 6, the bottom of the supporting portion 1 is provided with the first groove 201, and the other side of the first light barrier 4 opposite to the side thereof fixed to the first shaft 2 is provided with the first fixing member 101. When the first light barrier 4 is in the expanded state, the first fixing member 101 can be stuck into the first groove 201, for fixing the other side of the first light barrier 4 opposite to the side fixed to the first shaft 2. The side of the supporting portion 1 opposite to the side thereof adjacent to the first shaft and the second shaft may further comprise a second groove 202 (for example, the surface on the bottom of the supporting portion as shown in FIG. 6 comprises the second groove 202), and the other side of the second light barrier 6 opposite to the side thereof fixed to the second shaft 7 may further comprise a second fixing member 102. When the second light barrier 6 is in the expanded state, the second fixing member 102 can be stuck into the second groove 202, for fixing the other side of the second light barrier 6 opposite to the side fixed to the second shaft 7. The first fixing member 101 and the second fixing member 102 can be but are not limited to a L shape.

In some embodiments of this disclosure, when both the first shaft 2 and the second shaft 7 are arranged on the supporting portion 1, the first shaft 2 and the second shaft 7 are arranged in a interleaved manner, i.e. the orthographic projections of the first shaft 2 and the second shaft 7 on the liquid crystal panel 5 are not overlapped in the radial direction. When the sun visor achieves the intelligent light control function, the first light barrier 4 and the second light barrier 6 both are in the storage state, and the lights will not interfere with each other.

In some embodiments of this disclosure, the supporting portion 1 can also be transparent, which will not interfere with the driver's local vision, and a transparent PC or PMMA material can be used. The supporting portion 1 is not limited to the above materials.

In some embodiments of this disclosure, the first light barrier 4 and the second light barrier 6 are flexible, capable of being stored, expanded and so on.

To sum up, the sun visor provided according to the embodiments of the present disclosure comprises: a supporting portion 1, a first light barrier 4, a second light barrier 6, a liquid crystal panel 5, a photosensitive sensor 8 and a control circuit. When the first light barrier 4 and the second light barrier both are in the storage states, the photosensitive sensor 8 can detect the intensity of the interference light. By adjusting the driving voltage of the liquid crystal panel 5 by the control circuit, and thereby adjusting the light transmittance of the liquid crystal panel 5, the intelligent light control function can be realized. When the ambient light is sufficient, the liquid crystal panel 5 can perform transmissive display. The sun visor may further comprise a light source 3, and when the first light barrier 4 is in the expanded state and the second light barrier 6 is in the contracted state, the liquid crystal panel 5 utilizes the light source 3 as a backlight source for display, thereby realizing the display function. When the first light barrier 4 and the second light barrier 6 both are in the expanded states, the sun visor can shade the interference light like a traditional sun visor, to realize the function of the traditional sun visor. The liquid crystal panel 5 does not work at all, to save power consumption. Therefore, it solves the problem that the sun visor in the prior art only has a single function, satisfies different users' usage habits, enhances the user experience, and achieves the effect of enriching the function of the sun visor.

Only preferred embodiments of the present disclosure are described above, but they are not used for limiting the present disclosure, and any modification, equivalent replacement, variation made within the spirit and principle of the present disclosure should fall within the protection scope of the present disclosure.

The present application claims the priority of the Chinese patent application No. 201710079128.5 filed on Feb. 14, 2017, which is hereby incorporated by reference in its entirety as a part of the present application.

The invention claimed is:

1. A sun visor comprising:
a supporting portion;
a liquid crystal panel fixed onto the supporting portion, or provided integrally with the supporting portion;
a first light barrier at least including an expanded state and a storage state, wherein the first light barrier is parallel or approximately parallel with the liquid crystal panel when in the expanded state, and an orthographic projection of the liquid crystal panel on the first light barrier falls into the first light barrier;
a photosensitive sensor configured for detecting an intensity of an interference light; and
a control circuit connected with the photosensitive sensor and the liquid crystal panel, and configured for adjusting a driving voltage of the liquid crystal panel according to a detection result of the photosensitive sensor,
a second light barrier which is parallel with the liquid crystal panel when in an expanded state;
a second shaft fixed to the first side of the supporting portion, located on a side of the liquid crystal panel close to a user, and being parallel with the liquid crystal panel;
wherein a side of the second light barrier is fixed onto the second shaft, and is capable of being stretched in a direction parallel with the liquid crystal panel and contracted onto the second shaft in a windable manner.

2. The sun visor according to claim 1, further comprising a light source fixed onto the supporting portion, wherein the light source is interposed between the first light barrier and the liquid crystal panel; and
a side of the first light barrier close to the liquid crystal panel comprises a reflective layer.

3. The sun visor according to claim 1, further comprising:
a first shaft fixed to a first side of the supporting portion, located at a side of the liquid crystal panel facing away from a user and being parallel with the second shaft;
a side of the first light barrier is fixed onto the first shaft, and is capable of being stretched in a direction parallel with the liquid crystal Panel and contracted onto the first shaft in a windable manner.

4. The sun visor according to claim 3, wherein:
orthographic projections of the first shaft and the second shaft on the liquid crystal panel in a radial direction do not overlap with each other.

5. The sun visor according to claim 1, wherein the first light barrier further comprises a first fixing member,
wherein the first fixing member is arranged on a side opposite to the side of the first light barrier fixed onto the first shaft, for fixing the side opposite to the side of the first light barrier fixed onto the first shaft, onto a second side of the supporting portion, when the first light barrier is in the expanded state.

6. The sun visor according to claim 5, wherein the second side of the supporting portion is provided with a first groove, such that the first fixing member sticks into the first groove when the first light barrier is in the expanded state.

7. The sun visor according to claim 1, wherein the second light barrier further comprises a second fixing member,
wherein the second fixing member is arranged on a side opposite to the side of the second light barrier fixed onto the second shaft, for fixing the side opposite to the side of the second light barrier fixed onto the second shaft, onto a second side of the supporting portion, when the second light barrier is in the expanded state.

8. The sun visor according to claim 7, wherein the second side of the supporting portion is provided with a second groove, such that the second fixing member sticks into the second groove when the second light barrier is in the expanded state.

9. The sun visor according to claim 1, wherein the first light barrier and the second light barrier are flexible.

10. The sun visor according to claim 4, wherein the first light barrier and the second light barrier are flexible.

11. The sun visor according to claim 2, wherein the first light barrier and the second light barrier are flexible.

12. The sun visor according to claim 3, wherein the first light barrier and the second light barrier are flexible.

13. The sun visor according to claim 5, wherein the first light barrier and the second light barrier are flexible.

14. The sun visor according to claim 6, wherein the first light barrier and the second light barrier are flexible.

* * * * *